United States Patent
Luo (10) Patent No.: US 11,076,144 B2
(45) Date of Patent: Jul. 27, 2021

(54) METHOD AND APPARATUS FOR OBTAINING IMAGE, STORAGE MEDIUM AND ELECTRONIC DEVICE

(71) Applicant: CLOUDMINDS (SHENZHEN) ROBOTICS SYSTEMS CO., LTD., Shenzhen (CN)

(72) Inventor: Lei Luo, Shenzhen (CN)

(*) Notice: Subject to any disclaimer, the term of this patent is extended or adjusted under 35 U.S.C. 154(b) by 0 days.

(21) Appl. No.: 16/714,289

(22) Filed: Dec. 13, 2019

(65) Prior Publication Data
US 2020/0195905 A1 Jun. 18, 2020

(30) Foreign Application Priority Data

Dec. 14, 2018 (CN) .......................... 201811536333.0

(51) Int. Cl.
*H04N 13/239* (2018.01)
*G06K 9/00* (2006.01)
*H04N 13/00* (2018.01)

(52) U.S. Cl.
CPC ....... *H04N 13/239* (2018.05); *G06K 9/00248* (2013.01); *G06K 9/00288* (2013.01); *H04N 2013/0081* (2013.01)

(58) Field of Classification Search
CPC ......... H04N 13/239; H04N 2013/0081; G06K 9/00248; G06K 9/00288
See application file for complete search history.

(56) References Cited

U.S. PATENT DOCUMENTS

| 3,784,738 A * | 1/1974 | Natter ................ H04N 13/344 348/49 |
| 4,650,305 A * | 3/1987 | Hines .................... G03B 35/08 352/59 |
| 5,065,236 A * | 11/1991 | Diner ................... H04N 13/341 348/54 |
| 6,864,911 B1* | 3/2005 | Zhang ................ H04N 1/00347 348/42 |
| 9,832,419 B2* | 11/2017 | Urabe .................. H04N 9/8205 |
| 2010/0238272 A1* | 9/2010 | Cameron ............... G03B 35/00 348/47 |
| 2010/0239240 A1* | 9/2010 | Cameron ............... G03B 35/00 396/325 |

(Continued)

FOREIGN PATENT DOCUMENTS

| CN | 1874422 A | 1/2009 |
| CN | 102693060 A | 9/2012 |

(Continued)

*Primary Examiner* — David E Harvey
(74) *Attorney, Agent, or Firm* — Tucker Ellis LLP (57) ABSTRACT

The object of the present disclosure is to provide a method and apparatus for obtaining an image, a storage medium and an electronic device, in order to solve the problem that the shooting operation of 3D images in related art is not flexible enough. The method includes: obtaining interpupillary distance information of a target user in response to an operation of shooting a 3D image; adjusting a double-shooting spacing of a binocular camera of an electronic device according to the interpupillary distance information of the target user and a preset corresponding relationship between the interpupillary distance and the double-shooting spacing; and shooting a 3D image through the adjusted binocular camera.

8 Claims, 4 Drawing Sheets

(56) References Cited

U.S. PATENT DOCUMENTS

| | | | |
|---|---|---|---|
| 2010/0247088 A1* | 9/2010 | Campbell | G03B 35/00 396/325 |
| 2011/0085025 A1* | 4/2011 | Pace | H04N 13/189 348/49 |
| 2011/0085142 A1* | 4/2011 | Pace | G03B 35/08 352/48 |
| 2011/0085790 A1* | 4/2011 | Pace | G03B 35/00 396/326 |
| 2011/0187836 A1* | 8/2011 | Gotoh | H04N 13/356 348/51 |
| 2011/0242286 A1* | 10/2011 | Pace | H04N 13/239 348/47 |
| 2011/0243542 A1* | 10/2011 | Pace | G03B 35/08 396/325 |
| 2011/0243543 A1* | 10/2011 | Pace | G03B 35/08 396/325 |
| 2012/0086779 A1* | 4/2012 | Morifuji | H04N 13/239 348/46 |
| 2012/0195583 A1* | 8/2012 | Pace | H04N 13/243 396/326 |
| 2012/0249532 A1* | 10/2012 | Kawada | H04N 13/128 345/419 |
| 2013/0010358 A1* | 1/2013 | Park | H04N 13/398 359/464 |
| 2013/0202274 A1* | 8/2013 | Chan | H04N 13/239 386/362 |
| 2014/0125660 A1* | 5/2014 | Redmann | G06T 15/04 345/419 |
| 2015/0097930 A1* | 4/2015 | Masuno | G03B 35/08 348/47 |
| 2015/0358611 A1* | 12/2015 | Cui | G06T 7/593 348/49 |
| 2016/0033770 A1* | 2/2016 | Fujimaki | H04N 13/344 345/8 |
| 2016/0057408 A1* | 2/2016 | Jeger | G02B 30/26 348/54 |
| 2016/0366394 A1* | 12/2016 | Park | H04N 13/296 |
| 2017/0026634 A1* | 1/2017 | Mirlay | G03B 13/02 |
| 2017/0285337 A1 | 10/2017 | Wilson et al. | |
| 2017/0337737 A1* | 11/2017 | Edwards | F16M 13/04 |
| 2017/0358062 A1* | 12/2017 | Podnar | G06T 5/006 |
| 2018/0096503 A1* | 4/2018 | Kaehler | G02B 27/0172 |
| 2018/0348860 A1* | 12/2018 | Lin | G02B 27/0179 |
| 2019/0058870 A1* | 2/2019 | Rowell | G06T 7/85 |
| 2019/0158813 A1* | 5/2019 | Rowell | H04N 13/189 |
| 2019/0208181 A1* | 7/2019 | Rowell | H04N 5/23267 |
| 2019/0349561 A1* | 11/2019 | Rogers | H04M 1/0264 |
| 2019/0387168 A1* | 12/2019 | Smith | G06F 3/0304 |
| 2020/0041799 A1* | 2/2020 | Zhu | G02B 27/017 |
| 2020/0186787 A1* | 6/2020 | Cantero Clares | H04N 13/106 |

FOREIGN PATENT DOCUMENTS

| | | |
|---|---|---|
| CN | 103546627 A | 1/2014 |
| CN | 104202591 A | 12/2014 |
| CN | 104853092 A | 8/2015 |
| CN | 105334682 B | 2/2016 |
| CN | 105611278 A | 5/2016 |
| CN | 105704479 A | 6/2016 |
| CN | 106803950 A | 6/2017 |
| CN | 107566728 A | 1/2018 |
| CN | 107659772 A | 2/2018 |
| CN | 108259888 A | 7/2018 |
| JP | 2018151459 A | 9/2018 |

\* cited by examiner

METHOD AND APPARATUS FOR OBTAINING IMAGE, STORAGE MEDIUM AND ELECTRONIC DEVICE

CROSS-REFERENCE TO RELATED APPLICATION

The present application claims priority to Chinese Patent Application No. 201811536333.0 filed on Dec. 14, 2018, the content of which is incorporated herein by reference in its entirety.

FIELD OF THE INVENTION

The present disclosure relates to the field of photographing technology, and in particular, to a method and apparatus for obtaining an image, a storage medium and an electronic device.

BACKGROUND ART

With the increase in user demands, more and more electronic devices are equipped with binocular cameras with 3D camera shooting functions. In related art, the binocular camera adopts a fixed structure, and a double-shooting spacing of which is set according to an average interpupillary distance of a plurality of users. Thus, an obtained 3D image is also captured based on the set double-shooting spacing. The method of setting the double-shooting spacing by using the average interpupillary distance enables a viewer whose interpupillary distance meets the average interpupillary distance to have excellent experience when viewing the 3D image.

However, for a viewer with a large deviation between the interpupillary distance and the average interpupillary distance, since the 3D image is deviated in the eyes of the viewer, the viewer cannot obtain good experience when viewing the 3D image. Sense of reality of a scenario presented by the 3D image is bad, and may even cause symptoms of dizziness of the viewer.

SUMMARY OF THE INVENTION

The object of the present disclosure is to provide a method and apparatus for obtaining an image, a storage medium and an electronic device, in order to solve the problem that the shooting operation of 3D images in related art is not flexible enough.

In order to achieve the above object, in a first aspect, the present disclosure provides a method for obtaining an image, including:

obtaining interpupillary distance information of a target user in response to an operation of shooting a 3D image;

adjusting a double-shooting spacing of a binocular camera of an electronic device according to the interpupillary distance information of the target user and a preset corresponding relationship between the interpupillary distance and the double-shooting spacing; and shooting a 3D image through the adjusted binocular camera.

Optionally, the method further includes:
obtaining tag information of the target user;
storing the tag information with the 3D image correspondingly;
obtaining tag information of a viewer in response to an operation of playing the 3D image;
judging whether the tag information of the viewer and the tag information of the target user meet a preset matching condition; and sending a prompt information if the preset matching condition is not met, wherein the prompt information is used for prompting the viewer to select to play the 3D image in a 2D mode.

Optionally, the tag information includes the interpupillary distance information;

the judging whether the tag information of the viewer and the tag information of the target user meet a preset matching condition includes:

judging whether the difference between the interpupillary distance of the viewer and the interpupillary distance of the target user is less than an interpupillary distance difference threshold; and determining that the preset matching condition is met if the difference is less than the interpupillary distance difference threshold.

Optionally, the tag information includes collected user identification information;

the judging whether the tag information of the viewer and the tag information of the target user meet a preset matching condition includes:

judging whether the collected user identification information of the target user and the user identification information of the viewer correspond to the same user identity; and determining that the preset matching condition is met if the collected user identification information of the target user and the user identification information of the viewer correspond to the same user identity.

Optionally, the obtaining interpupillary distance information of a target user includes:

obtaining user identification information collected when the electronic device is unlocked in response to an operation of shooting a 3D image; and determining interpupillary distance information of a target user according to the user identification information and a stored corresponding relationship between the user identification information and the interpupillary distance information.

Optionally, the user identification information is facial feature information and/or iris feature information.

Optionally, the method further includes:
obtaining a facial image of the target user, wherein the facial image is used for extracting the user identification information of the target user; and extracting the interpupillary distance information of the target user from the facial image, and storing the interpupillary distance information with the user identification information correspondingly.

Optionally, the adjusting a double-shooting spacing of a binocular camera of an electronic device includes:

controlling at least one camera in the binocular camera to move toward a direction approaching to or departing from the other camera.

In a second aspect, the present disclosure provides an apparatus for obtaining an image, including:

an obtaining module, configured to obtain interpupillary distance information of a target user in response to an operation of shooting a 3D image;

an adjusting module, configured to adjust a double-shooting spacing of a binocular camera of an electronic device according to the interpupillary distance information of the target user and a preset corresponding relationship between the interpupillary distance and the double-shooting spacing; and a shooting module, configured to shoot a 3D image through the adjusted binocular camera.

Optionally, the obtaining module is configured to obtain tag information of the target user; store the tag information with the 3D image correspondingly; and obtain tag information of a viewer in response to an operation of playing the 3D image;

the apparatus further includes:

a judging module, configured to judge whether the tag information of the viewer and the tag information of the target user meet a preset matching condition; and a prompting module, configured to send a prompt information if the preset matching condition is not met, wherein the prompt information is used for prompting the viewer to select to play the 3D image in a 2D mode.

Optionally, the tag information includes the interpupillary distance information;

the judging module is configured to:

judge whether the difference between the interpupillary distance of the viewer and the interpupillary distance of the target user is less than an interpupillary distance difference threshold; and determine that the preset matching condition is met if the difference is less than the interpupillary distance difference threshold.

Optionally, the tag information includes collected user identification information;

the judging module is configured to:

judge whether the collected user identification information of the target user and the user identification information of the viewer correspond to the same user identity; and determine that the preset matching condition is met if the collected user identification information of the target user and the user identification information of the viewer correspond to the same user identity.

Optionally, the obtaining module is configured to:

obtain user identification information collected when the electronic device is unlocked in response to an operation of shooting a 3D image; and determine interpupillary distance information of a target user according to the user identification information and a stored corresponding relationship between the user identification information and the interpupillary distance information.

Optionally, the user identification information is facial feature information and/or iris feature information.

Optionally, the obtaining module is configured to:

obtain a facial image of the target user, wherein the facial image is used for extracting the user identification information of the target user; and extract the interpupillary distance information of the target user from the facial image, and store the interpupillary distance information with the user identification information correspondingly.

Optionally, the adjusting module is configured to control at least one camera in the binocular camera to move toward a direction approaching to or departing from the other camera.

In a third aspect, the present disclosure provides a computer readable storage medium, wherein a computer program is stored thereon, and the program, when being executed by a processor, implements the steps of the method for obtaining the image in any item.

In a fourth aspect, the present disclosure provides an electronic device, including:

a memory on which a computer program is stored; and a processor, configured to execute the computer program in the memory to implement the steps of the method for obtaining the image in any item.

The above technical solutions can at least achieve the following technical effects:

The double-shooting spacing is obtained according to the obtained interpupillary distance information of the target user so as to adjust the position of the binocular camera, and then the 3D image is captured according to the adjusted camera. Since the attitude of the binocular camera can be adaptively adjusted according to the interpupillary distance of the target user in a shooting process, when the target user views the 3D image, a better visual effect can be achieved, and the viewing experience of the user is improved.

Other features and advantages of the present disclosure will be described in detail in the detailed description section that follows.

BRIEF DESCRIPTION OF THE DRAWINGS

The drawings are used for providing a further understanding of the present disclosure and constitute a part of the specification. The drawings, together with the following specific embodiments, are used for explaining the present disclosure, but do not constitute limitation to the present disclosure. In the drawings.

DETAILED DESCRIPTION OF THE EMBODIMENTS

The specific embodiments of the present disclosure will be described in detail below in combination with the drawings. It should be understood that the specific embodiments described herein are merely used for illustrating and explaining the present disclosure, rather than limiting the present disclosure.

Figure 1:
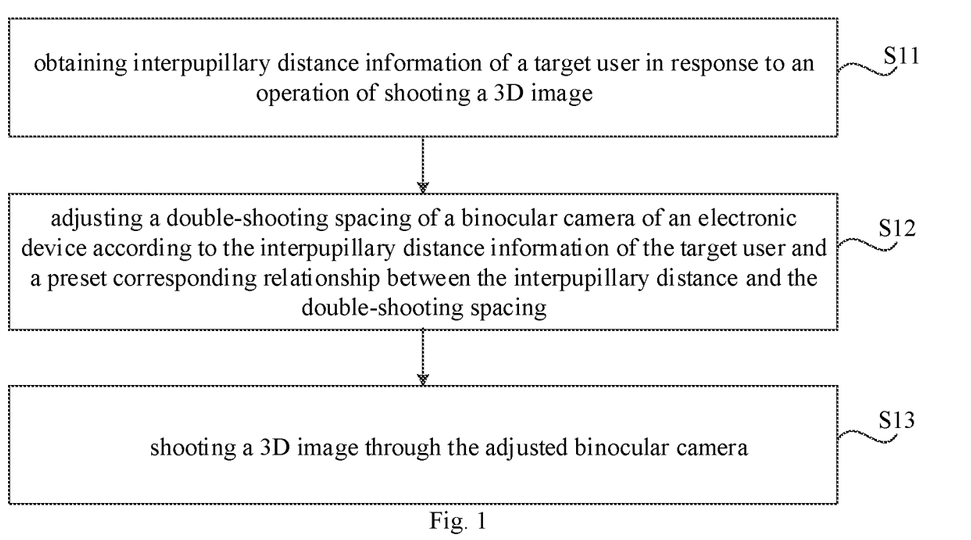
FIG. 1 is a flow diagram of a method for obtaining an image shown according to an exemplary embodiment.

FIG. 1 is a flow diagram of a method for obtaining an image shown according to an exemplary embodiment. The method may be applied to personal electronic devices, such as smart phones, smart tablet devices, and the like. The method includes:

S11. interpupillary distance information of a target user is obtained in response to an operation of shooting a 3D image.

In an optional embodiment, the obtaining interpupillary distance information of a target user includes: obtaining user identification information collected when the electronic device is unlocked in response to an operation of shooting a 3D image; and determining interpupillary distance information of a target user according to the user identification information and a stored corresponding relationship between the user identification information and the interpupillary distance information.

In the embodiment, the target user is essentially a user unlocking the electronic device currently.

The user identification information may be biological feature information of the user, for example, fingerprint feature information, palm print feature information, iris feature information, or facial feature information. Further, the user identification information may also be account name information input by the user.

During specific implementation, the user identification information and the interpupillary distance information of the user are obtained in an operation related to setting the unlocking of the electronic device, and the obtained user identification information is stored with the interpupillary distance information correspondingly.

Preferably, the user identification information is facial feature information and/or iris feature information; the method further includes: obtaining a facial image of the target user, wherein the facial image is used for extracting the user identification information of the target user; and extracting the interpupillary distance information of the target user from the facial image, and storing the interpupillary distance information with the user identification information correspondingly.

Specifically, the facial image may be obtained by a front camera of the electronic device.

The iris feature information or the facial feature information may be extracted from the facial image of the user, and the interpupillary distance information may also be extracted from the facial image. In this way, the user may complete the input of the user identification information and the interpupillary distance information just by inputting the facial image, and the operation of inputting the interpupillary distance information by the user is not increased, so that the convenience of the operation is improved.

In another optional embodiment, the user identification information is facial feature information and/or iris feature information; and the obtaining interpupillary distance information of a target user includes: obtaining the interpupillary distance information of the target user in response to an operation of inputting the facial feature information and/or the iris feature information by the user, and storing the interpupillary distance information with the user identification information correspondingly.

Specifically, the interpupillary distance information of the user may be synchronously obtained by an algorithm of measuring the interpupillary distance while the facial feature information and/or the iris feature information of the user is recorded through a monocular camera, the binocular camera or a laser radar camera.

In addition, in another optional embodiment, the obtaining interpupillary distance information of a target user includes: collecting the interpupillary distance information of the target user in response to the operation of shooting the 3D image. In other words, the interpupillary distance information of the target user is directly obtained before the 3D image is captured.

Different from the above optional embodiment, in the present optional embodiment, the target user is substantially the user performing a shooting action, and then the obtained target interpupillary distance is also the interpupillary distance of the photographer. During specific implementation, the user can select how to obtain the interpupillary distance information of the target user.

S12. a double-shooting spacing of a binocular camera of an electronic device is adjusted according to the interpupillary distance information of the target user and a preset corresponding relationship between the interpupillary distance and the double-shooting spacing.

It is worth noting that the interpupillary distance and the double-shooting spacing are not necessarily equal, and it may be preset that an algorithm (corresponding relationship) of a better double-shooting spacing is calculated by the interpupillary distance, and then the double-shooting spacing is further obtained.

The binocular camera composed of a first camera and a second camera is disposed on the electronic device. The double-shooting spacing is the spacing between the two cameras. For example, when applied to a smart phone, the two cameras may be disposed side by side on the back of the smart phone.

The adjusting a double-shooting spacing of a binocular camera of an electronic device includes: controlling at least one camera in the binocular camera to move toward a direction approaching to or departing from the other camera.

Figure 2:
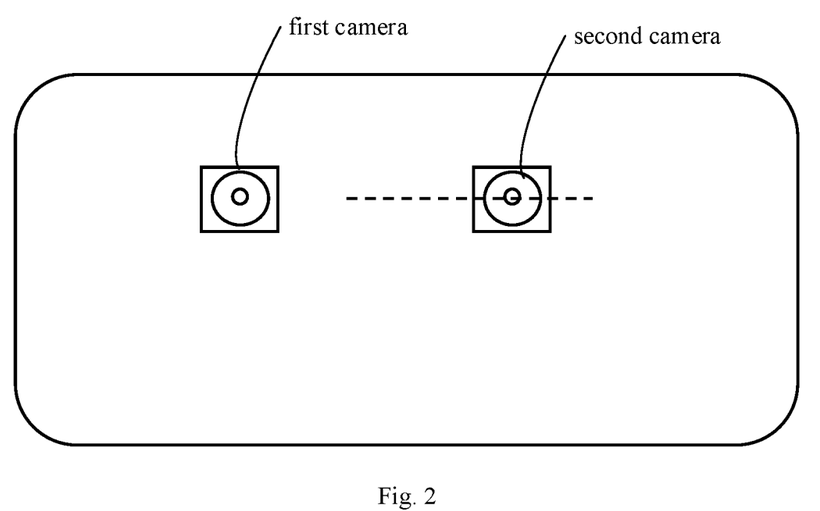
FIG. 2 is a scenario schematic diagram of a method for obtaining an image shown according to an exemplary embodiment.

Exemplarily, as shown in FIG. 2, the first camera may be fixed, and the second camera may move toward a direction approaching to or departing from the first camera along a set trajectory (shown by a broken line). When the second camera moves toward the direction approaching to the first camera, the distance between the two cameras is shortened, that is, the double-shooting spacing becomes smaller; and when the second camera moves toward the direction departing from the first camera, the distance between the two cameras is increased, that is, the double-shooting spacing becomes larger.

Figure 3:
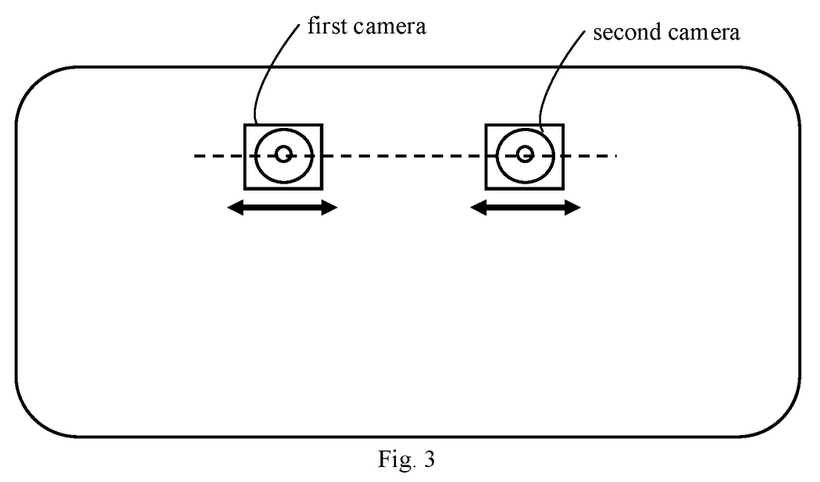
FIG. 3 is a scenario schematic diagram of another method for obtaining an image shown according to an exemplary embodiment.

Alternatively, as shown in FIG. 3, both cameras may move along the set trajectory (shown by the broken line). When a larger double-shooting spacing is required, the two cameras are controlled to move backwards; and when a smaller double-shooting spacing is required, the two cameras are controlled to move toward each other.

S13. a 3D image is captured through the adjusted binocular camera.

The above technical solutions can at least achieve the following technical effects:

The double-shooting spacing is obtained according to the obtained interpupillary distance information of the target user so as to adjust the position of the binocular camera, and then the 3D image is captured according to the adjusted camera. Since the attitude of the binocular camera can be adaptively adjusted according to the interpupillary distance of the target user in a shooting process, when the target user views the 3D image, a better visual effect can be achieved, and the viewing experience of the user is improved.

Figure 4:
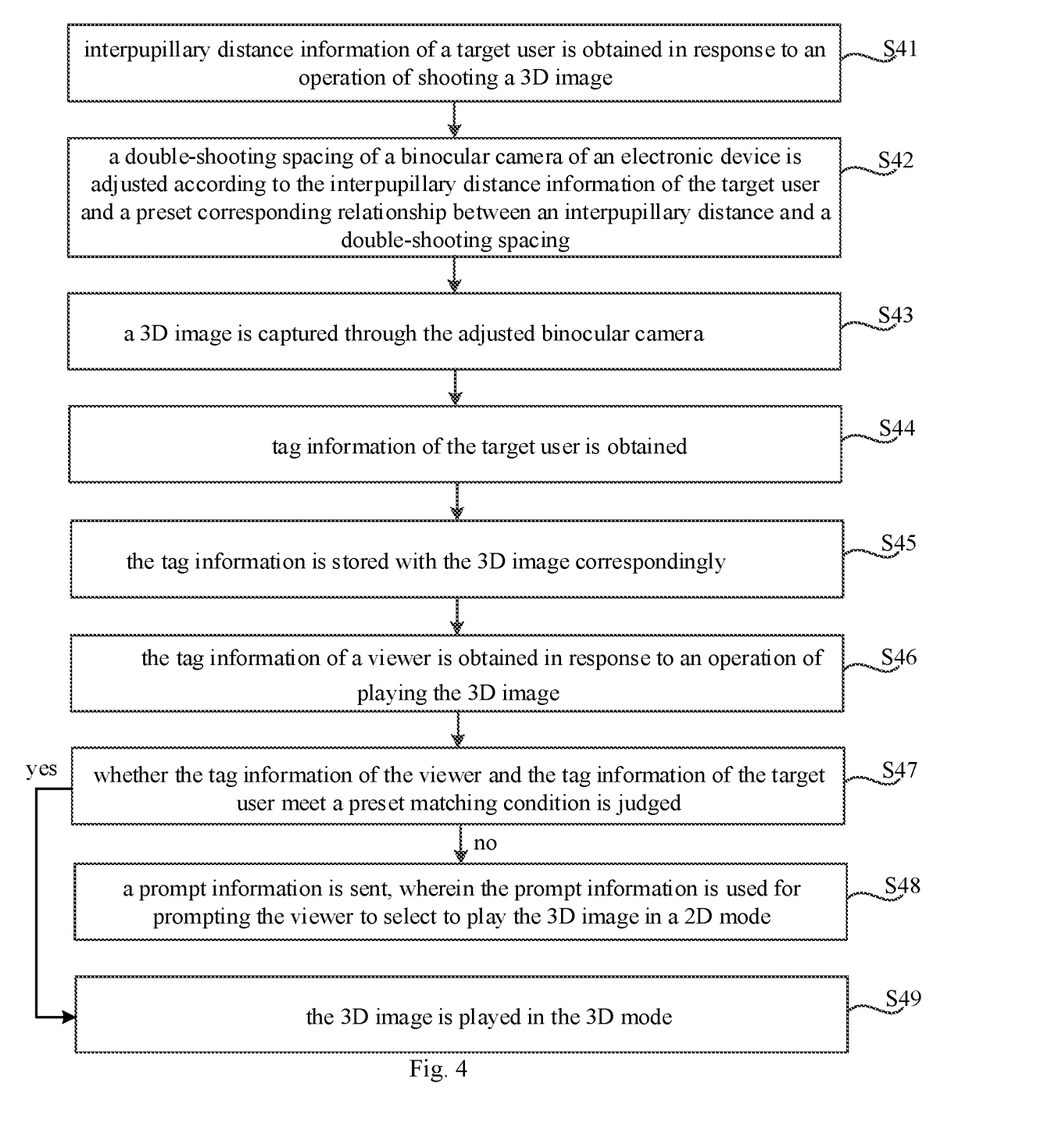
FIG. 4 is a flow diagram of another method for obtaining an image shown according to an exemplary embodiment.

FIG. 4 is a method for obtaining an image shown according to an exemplary embodiment. The method may be applied to personal electronic devices, such as smart phones, smart tablet devices, and the like. The method includes:

S41. interpupillary distance information of a target user is obtained in response to an operation of shooting a 3D image.

In an optional embodiment, the obtaining interpupillary distance information of a target user includes: obtaining user identification information collected when the electronic device is unlocked in response to an operation of shooting a 3D image; and determining the interpupillary distance information of the target user according to the user identification information and a stored corresponding relationship between the user identification information and the interpupillary distance information.

In the embodiment, the target user is essentially a user unlocking the electronic device currently.

The user identification information may be biological feature information of the user, for example, fingerprint feature information, palm print feature information, iris feature information, or facial feature information. Further, the user identification information may also be account name information input by the user.

During specific implementation, the user identification information and the interpupillary distance information of the user are obtained in an operation related to setting the unlocking of the electronic device, and the obtained user identification information is stored with the interpupillary distance information correspondingly.

Optionally, the method further includes: obtaining a facial image of the target user, wherein the facial image is used for extracting the user identification information of the target user; and extracting the interpupillary distance information of the target user from the facial image, and storing the interpupillary distance information with the user identification information correspondingly.

Preferably, the user identification information is facial feature information, iris feature information, cheilogramma feature information, or ear contour feature information and the like. Specifically, the facial image may be obtained by a front camera of the electronic device.

The iris feature information or the facial feature information may be extracted from the facial image of the user, and the interpupillary distance information may also be extracted from the facial image. In this way, the user may complete the input of the user identification information and the interpupillary distance information just by inputting the facial image, and the operation of inputting the interpupillary distance information by the user is not increased, so that the convenience of the operation is improved.

In another optional embodiment, the user identification information is facial feature information and/or iris feature information; and the obtaining interpupillary distance information of a target user includes: obtaining the interpupillary distance information of the target user in response to an operation of inputting the facial feature information and/or the iris feature information by the user, and storing the interpupillary distance information with the user identification information correspondingly.

Specifically, the interpupillary distance information of the user may be synchronously obtained by an algorithm of measuring the interpupillary distance while the facial feature information and/or the iris feature information of the user is recorded through a monocular camera, the binocular camera or a laser radar camera.

In addition, in another optional embodiment, the obtaining interpupillary distance information of a target user includes: collecting the interpupillary distance information of the target user in response to the operation of shooting a 3D image. In other words, the interpupillary distance information of the target user is directly obtained before the 3D image is captured.

Different from the above optional embodiment, in the present optional embodiment, the target user is substantially the user performing a shooting action, and then the obtained target interpupillary distance is also the interpupillary distance of the photographer. During specific implementation, the user can select how to obtain the interpupillary distance information of the target user.

S42. a double-shooting spacing of a binocular camera of an electronic device is adjusted according to the interpupillary distance information of the target user and a preset corresponding relationship between the interpupillary distance and the double-shooting spacing.

It is worth noting that the interpupillary distance and the double-shooting spacing are not necessarily equal, and it may be preset that an algorithm (corresponding relationship) of a better double-shooting spacing is calculated by the interpupillary distance, and then the double-shooting spacing is further obtained.

The binocular camera composed of a first camera and a second camera is disposed on the electronic device. The double-shooting spacing is the spacing between the two cameras. For example, when applied to a smart phone, the two cameras may be disposed side by side on the back of the smart phone.

The adjusting a double-shooting spacing of a binocular camera of an electronic device includes: controlling at least one camera in the binocular camera to move toward a direction approaching to or departing from the other camera.

Exemplarily, as shown in FIG. 2, the first camera may be fixed, and the second camera may move toward a direction approaching to or departing from the first camera along a set trajectory (shown by a broken line). When the second camera moves toward the direction approaching to the first camera, the distance between the two cameras is shortened, that is, the double-shooting spacing becomes smaller; and when the second camera moves toward the direction departing from the first camera, the distance between the two cameras is increased, that is, the double-shooting spacing becomes larger.

Alternatively, as shown in FIG. 3, both cameras may move (the movement direction is shown by a double-headed arrow) along the set trajectory (shown by the broken line). When a larger double-shooting spacing is required, the two cameras are controlled to move backwards; and when a smaller double-shooting spacing is required, the two cameras are controlled to move toward each other.

S43. a 3D image is captured through the adjusted binocular camera.

S44. tag information of the target user is obtained.

S45. the tag information is stored with the 3D image correspondingly.

S46. the tag information of a viewer is obtained in response to an operation of playing the 3D image.

S47. whether the tag information of the viewer and the tag information of the target user meet a preset matching condition is judged.

If the preset matching condition is met, the viewer may obtain a better viewing effect while viewing the 3D image.

The above tag information may be understood as information unique to each user, and whether the viewer is consistent with the target user may be distinguished through the tag information.

Optionally, the tag information includes the interpupillary distance information; the judging whether the tag information of the viewer and the tag information of the target user meet a preset matching condition includes: judging whether the difference between the interpupillary distance of the viewer and the interpupillary distance of the target user is less than an interpupillary distance difference threshold; and determining that the preset matching condition is met if the difference is less than the interpupillary distance difference threshold.

The interpupillary distance difference threshold is adaptively adjusted according to the interpupillary distance information in the tag information of the target user. For example, the interpupillary distance difference threshold may be set to be 5% of the interpupillary distance of the target user, and when the difference between the interpupillary distance of the viewer and the interpupillary distance of the target user is less than 5% of the interpupillary distance of the target user, the preset matching condition is met.

Optionally, the tag information includes collected user identification information; the judging whether the tag information of the viewer and the tag information of the target user meet a preset matching condition includes: judging whether the collected user identification information of the target user and the user identification information of the viewer correspond to the same user identity; and if the collected user identification information of the target user and the user identification information of the viewer correspond to the same user identity, determining that the preset matching condition is met.

For example, in response to the operation of playing the 3D image, the user identification information of the viewer is obtained, such as facial feature information and/or iris feature information. Further, whether the user identification information of the viewer is consistent with the user identification information in the tag information stored in the corresponding 3D image is determined. If it is consistent, the collected user identification information of the target user and the user identification information of the viewer correspond to the same user identity. It is determined that the preset matching condition is met.

S48. if the preset matching condition is not met, a prompt information is sent, wherein the prompt information is used for prompting the viewer to select to play the 3D image in a 2D mode.

If the preset matching condition is not met, it may indicate that the difference between the interpupillary distance of the viewer and the interpupillary distance of the target user is larger, and if the 3D image is viewed in a 3D mode, the experience effect is not good, and the viewer may experience symptoms such as dizziness. If the viewer selects to play the 3D image in the 2D mode, more comfortable viewing experience may be obtained.

S49. if the preset matching condition is met, the 3D image is played in the 3D mode.

The above technical solutions can at least achieve the following technical effects:

The double-shooting spacing is obtained according to the obtained interpupillary distance information of the target user so as to adjust the position of the binocular camera, and then the 3D image is captured according to the adjusted camera. Since the attitude of the binocular camera can be adaptively adjusted according to the interpupillary distance of the target user in a shooting process, when the target user views the 3D image, a better visual effect can be achieved, and the viewing experience of the user is improved.

In addition, whether the tag information of the viewer and the tag information of the target user meet the preset matching condition may also be judged in response to the operation of playing the 3D image. If the preset matching condition is not met, prompt to select the 2D mode to reduce the bad experience of the viewer.

Figure 5:
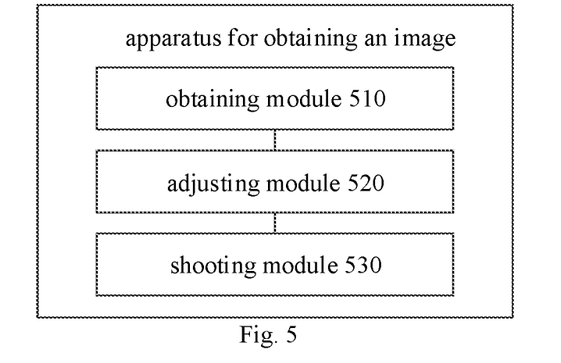
FIG. 5 is a block diagram of another apparatus for obtaining an image shown according to an exemplary embodiment.

FIG. 5 is a block diagram of an apparatus for obtaining an image shown according to an exemplary embodiment. The apparatus includes:

an obtaining module 510, configured to obtain interpupillary distance information of a target user in response to an operation of shooting a 3D image;

an adjusting module 520, configured to adjust a double-shooting spacing of a binocular camera of an electronic device according to the interpupillary distance information of the target user and a preset corresponding relationship between the interpupillary distance and the double-shooting spacing; and a shooting module 530, configured to shoot a 3D image through the adjusted binocular camera.

The above technical solutions can at least achieve the following technical effects:

The double-shooting spacing is obtained according to the obtained interpupillary distance information of the target user so as to adjust the position of the binocular camera, and then the 3D image is captured according to the adjusted camera. Since the attitude of the binocular camera can be adaptively adjusted according to the interpupillary distance of the target user in a shooting process, when the target user views the 3D image, a better visual effect can be achieved, and the viewing experience of the user is improved.

Optionally, the obtaining module is configured to obtain tag information of the target user; store the tag information with the 3D image correspondingly; and obtain tag information of a viewer in response to an operation of playing the 3D image;

the apparatus further includes:

a judging module, configured to judge whether the tag information of the viewer and the tag information of the target user meet a preset matching condition; and a prompting module, configured to send a prompt information if the preset matching condition is not met, wherein the prompt information is used for prompting the viewer to select to play the 3D image in a 2D mode.

Optionally, the tag information includes the interpupillary distance information;

the judging module is configured to:

judge whether the difference between the interpupillary distance of the viewer and the interpupillary distance of the target user is less than an interpupillary distance difference threshold; and determine that the preset matching condition is met if the difference is less than the interpupillary distance difference threshold.

Optionally, the tag information includes collected user identification information;

the judging module is configured to:

judge whether the collected user identification information of the target user and the user identification information of the viewer correspond to the same user identity; and determine that the preset matching condition is met if the collected user identification information of the target user and the user identification information of the viewer correspond to the same user identity.

Optionally, the obtaining module is configured to:

obtain the user identification information collected when the electronic device is unlocked in response to an operation of shooting a 3D image; and determine the interpupillary distance information of the target user according to the user identification information and a stored corresponding relationship between the user identification information and the interpupillary distance information.

Optionally, the user identification information is facial feature information and/or iris feature information.

Optionally, the obtaining module is configured to:

obtain a facial image of the target user, wherein the facial image is used for extracting the user identification information of the target user; and extract the interpupillary distance information of the target user from the facial image, and store the interpupillary distance information with the user identification information correspondingly.

Optionally, the adjusting module is configured to control at least one camera in the binocular camera to move toward a direction approaching to or departing from the other camera.

The embodiment of the present disclosure provides a computer readable storage medium, wherein a computer program is stored thereon, and the program, when being executed by a processor, implements the steps of the method for obtaining the image in any item.

The embodiment of the present disclosure provides an electronic device, including:

a memory on which a computer program is stored; and a processor, configured to execute the computer program in the memory to implement the steps of the method for obtaining the image in any item.

Figure 6:
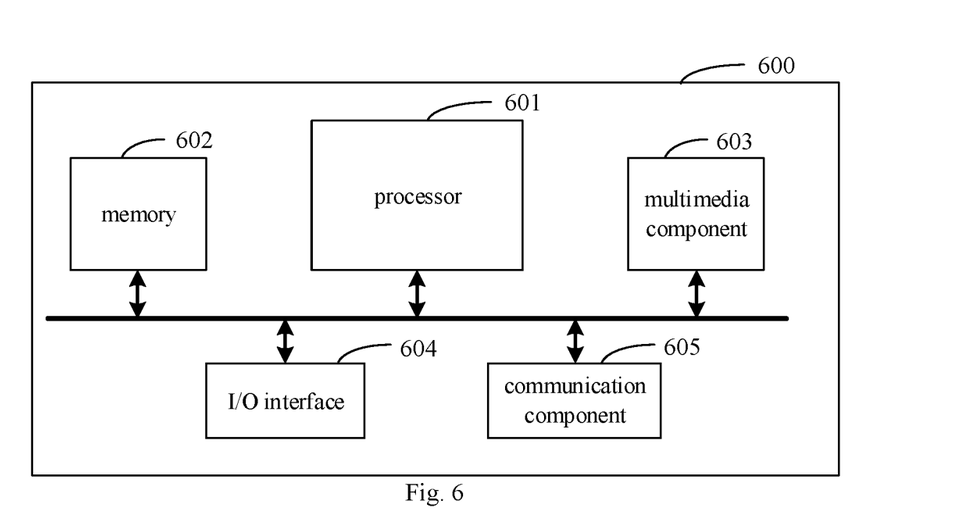
FIG. 6 is an apparatus block diagram of an electronic device shown according to an exemplary embodiment.

FIG. 6 is a block diagram of an electronic device shown according to an exemplary embodiment. The method may be applied to personal electronic devices, such as smart phones, smart tablet devices, and the like. The electronic device 600 is equipped with a binocular camera for obtaining 3D images.

As shown in FIG. 6, the electronic device 600 may include a processor 601 and a memory 602. The electronic device 600 may also include one or more of a multimedia component 603, an input/output (I/O) interface 604 and a communication component 605.

The processor 601 is configured to control the overall operation of the electronic device 600 to complete all or a part of the steps of the method for obtaining the image. The memory 602 is configured to store various types of data to support operations at the electronic device 600, for example, these data may include instructions for any application program or method operated on the electronic device 600, and data related to the application program, for example, interpupillary distance information, facial feature information, iris feature information, and the like, of the user, as another example, contact data, sent and received messages, pictures, audio, 3D videos, and the like. The memory 602 may be implemented by any type of volatile or non-volatile storage devices or a combination thereof, such as a static random access memory (referred to as SRAM), an electrically erasable programmable read-only memory (referred to as EEPROM), an erasable programmable read-only memory (referred to as EPROM), a programmable read-only memory (referred to as PROM), a read-only memory (referred to as ROM), a magnetic memory, a flash memory, a magnetic disk or an optical disk. The multimedia component 603 may include a screen and an audio component. The screen may be, for example, a touch screen, and the audio component is configured to output and/or input an audio signal. For example, the audio component may include a microphone, configured to receive an external audio signal. The received audio signal may be further stored in the memory 602 or transmitted via the communication component 605. The audio component further includes at least one loudspeaker for outputting the audio signal. The I/O interface 604 provides an interface between the processor 601 and other interface modules, and the other interface modules may be keyboards, mice, buttons, and the like. These buttons may be virtual buttons or physical buttons. The communication component 605 is used for wired or wireless communication between the electronic device 600 and other devices. The wireless communication includes, such as Wi-Fi, Bluetooth, near field communication (referred to as NFC), 2G, 3G or 4G, or a combination of one or more of them, so the corresponding communication component 605 may include: a Wi-Fi module, a Bluetooth module and an NFC module.

In an exemplary embodiment, the electronic device 600 may be implemented by one or more application specific integrated circuits (referred to as ASICs), digital signal processors (referred to as DSPs), digital signal processing devices (referred to as DSPDs), programmable logic devices (referred to as PLDs), field programmable gate arrays (referred to as FPGAs), controllers, microcontrollers, microprocessors or other electronic components, so as to execute the method for obtaining the image.

In another exemplary embodiment, a computer readable storage medium including a program instruction is also provided, and the program instruction, when being executed by a processor, implement the steps of the method of obtaining the image as described above. For example, the computer readable storage medium may be the above memory 602 including the program instruction, and the program instruction may be executed by the processor 601 of the electronic device 600 to execute the method for obtaining the image.

The binocular camera composed of a first camera and a second camera is disposed on the electronic device 600. The double-shooting spacing is the spacing between the two cameras. For example, when applied to a smart phone, the two cameras may be disposed side by side on the back of the smart phone.

In another exemplary embodiment, the first camera may be fixed, and the second camera may move toward a direction approaching to or departing from the first camera along a set trajectory (shown by a broken line). When the second camera moves toward the direction approaching to the first camera, the distance between the two cameras is shortened, that is, the double-shooting spacing becomes smaller; and when the second camera moves toward the direction departing from the first camera, the distance between the two cameras is increased, that is, the double-shooting spacing becomes larger.

Alternatively, both cameras may move along the set trajectory (shown by the broken line). When a larger double-shooting spacing is required, the two cameras are controlled to move backwards; and when a smaller double-shooting spacing is required, the two cameras are controlled to move toward each other.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple modifications are all within the protection scope of the present disclosure. It should be further noted that various specific technical features described in the above specific embodiments may be combined in any suitable manner without contradiction. In order to avoid unnecessary repetition, various possible combination manners are not described separately in the present disclosure.

In addition, any combination of various embodiments of the present disclosure may be made as long as it does not contradict the idea of the present disclosure, and it should also be regarded as the contents disclosed by the present disclosure.

The invention claimed is:

1. A method for obtaining an image, comprising:
    obtaining interpupillary distance information of a target user in response to an operation of shooting a 3D image;
    adjusting a double-shooting spacing of a binocular camera of an electronic device according to the interpupillary distance information of the target user and a preset corresponding relationship between the interpupillary distance and the double-shooting spacing;

shooting a 3D image through the adjusted binocular camera;
obtaining tag information of the target user;
storing the tag information with the 3D image correspondingly;
obtaining tag information of a viewer in response to an operation of playing the 3D image;
judging whether the tag information of the viewer and the tag information of the target user meet a preset matching condition; and
sending a prompt information if the preset matching condition is not met, wherein the prompt information is used for prompting the viewer to select to play the 3D image in a 2D mode.

2. The method of claim 1, wherein the tag information comprises the interpupillary distance information;
the judging whether the tag information of the viewer and the tag information of the target user meet a preset matching condition comprises:
judging whether the difference between the interpupillary distance of the viewer and the interpupillary distance of the target user is less than an interpupillary distance difference threshold; and
determining that the preset matching condition is met if the difference is less than the interpupillary distance difference threshold.

3. The method of claim 1, wherein the tag information comprises collected user identification information;
the judging whether the tag information of the viewer and the tag information of the target user meet a preset matching condition comprises:
judging whether the collected user identification information of the target user and the user identification information of the viewer correspond to the same user identity; and
determining that the preset matching condition is met if the collected user identification information of the target user and the user identification information of the viewer correspond to the same user identity.

4. The method of claim 1, wherein the obtaining interpupillary distance information of a target user comprises:
obtaining user identification information collected when the electronic device is unlocked in response to an operation of shooting a 3D image; and
determining interpupillary distance information of a target user according to the user identification information and a stored corresponding relationship between the user identification information and the interpupillary distance information.

5. The method of claim 4, wherein the method further comprises:
obtaining a facial image of the target user, wherein the facial image is used for extracting the user identification information of the target user; and
extracting the interpupillary distance information of the target user from the facial image, and storing the interpupillary distance information with the user identification information correspondingly.

6. The method of claim 1, wherein the adjusting a double-shooting spacing of a binocular camera of an electronic device comprises:
controlling at least one camera in the binocular camera to move toward a direction approaching to or departing from the other camera.

7. A non-transitory computer readable storage medium, wherein a computer program is stored thereon, and the program, when being executed by a processor, implement a method for obtaining an image comprising:
obtaining interpupillary distance information of a target user in response to an operation of shooting a 3D image;
adjusting a double-shooting spacing of a binocular camera of an electronic device according to the interpupillary distance information of the target user and a preset corresponding relationship between the interpupillary distance and the double-shooting spacing;
shooting a 3D image through the adjusted binocular camera;
obtaining tag information of the target user;
storing the tag information with the 3D image correspondingly;
obtaining tag information of a viewer in response to an operation of playing the 3D image;
judging whether the tag information of the viewer and the tag information of the target user meet a preset matching condition; and
sending a prompt information if the preset matching condition is not met, wherein the prompt information is used for prompting the viewer to select to play the 3D image in a 2D mode.

8. An electronic device, comprising:
a memory on which a computer program is stored; and
a processor, configured to execute the computer program in the memory to implement a method for obtaining an image comprising:
obtaining interpupillary distance information of a target user in response to an operation of shooting a 3D image;
adjusting a double-shooting spacing of a binocular camera of an electronic device according to the interpupillary distance information of the target user and a preset corresponding relationship between the interpupillary distance and the double-shooting spacing;
shooting a 3D image through the adjusted binocular camera;
obtaining tag information of the target user;
storing the tag information with the 3D image correspondingly;
obtaining tag information of a viewer in response to an operation of playing the 3D image;
judging whether the tag information of the viewer and the tag information of the target user meet a preset matching condition; and
sending a prompt information if the preset matching condition is not met, wherein the prompt information is used for prompting the viewer to select to play the 3D image in a 2D mode.

* * * * *